United States Patent [19]

Gaskill et al.

[11] Patent Number: 5,309,153
[45] Date of Patent: May 3, 1994

[54] ADAPTIVE ON-OFF CONTROL FOR RADIO RECEIVER

[75] Inventors: Garold B. Gaskill, Tualatin; Daniel J. Park, Portland, both of Oreg.

[73] Assignees: Seiko Corp.; Seiko Epson Corp., Japan

[21] Appl. No.: 668,389

[22] Filed: Mar. 13, 1991

Related U.S. Application Data

[60] Continuation of Ser. No. 422,825, Oct. 17, 1989, abandoned, which is a continuation-in-part of Ser. No. 356,630, May 22, 1989, Pat. No. 5,159,713, which is a continuation of Ser. No. 101,137, Sep. 24, 1987, abandoned, which is a division of Ser. No. 802,844, Nov. 27, 1985, Pat. No. 4,713,808.

[51] Int. Cl.⁵ .......................................... H04Q 1/00
[52] U.S. Cl. .......................... 340/825.44; 340/825.47; 455/38.2; 370/100.1
[58] Field of Search ................. 340/825.44, 825.47; 455/38.2, 38.3, 343; 370/100.1, 105.4, 106, 105.5

[56] References Cited

U.S. PATENT DOCUMENTS

| | | |
|---|---|---|
| 4,383,257 | 5/1983 | Giallanza et al. ............. 340/825.44 |
| 4,596,025 | 6/1986 | Satoh ............................. 370/100.1 |
| 4,694,473 | 9/1987 | Etoh ............................... 379/63 |
| 4,713,808 | 12/1987 | Gaskill et al. .................. 379/57 |
| 4,745,408 | 5/1988 | Nagata et al. ............... 340/825.44 |
| 4,803,703 | 2/1989 | DeLuca et al. ............... 370/106 |
| 4,939,753 | 7/1990 | Olson ........................... 370/100.1 |

Primary Examiner—Donald J. Yusko
Assistant Examiner—Brian Zimmerman
Attorney, Agent, or Firm—Elmer Galbi

[57] ABSTRACT

A paging system using synchronized transmission protocol and pagers active during monitor intervals to receive data transmitted during corresponding message intervals is provided with adaptive on-off radio receiver control for reducing monitor interval duration to conserve battery power. The adaptive on-off control is a function of recent timing errors and thereby accounts for environmental conditions.

5 Claims, 4 Drawing Sheets

ADAPTIVE ON-OFF CONTROL FOR RADIO RECEIVER

RELATED APPLICATIONS

The present application is a continuation of application Ser. No. 07/422,825, filed Oct. 17, 1989 which is now abandoned, which was a continuation-in-part of application Ser. No. 07/356,630 filed May 22, 1989 which is now issued as U.S. Pat. No. 5,159,713 which was a continuation of application Ser. No. 07/101,137 filed Sep. 24, 1987 (now abandoned) which was a division of application Ser. No. 06/802,844 filed Nov. 27, 1985 which issued as U.S. Pat. No. 4,713,808.

The present application is related to application Ser. No. 07/422,878 entitled RADIO Receiver WITH ADAPTIVE ON-OFF CONTROL, filed on Oct. 17, 1989, which is now abandoned, and application Ser. No. 07/668,369 filed Mar. 13, 1991 which is now issued as U.S. Pat. No. 5,155,479.

FIELD OF THE INVENTION

The present invention relates to radio receivers and, more particularly, to on-off control for radio paging systems.

BACKGROUND OF THE INVENTION

Many radio pagers are small portable devices carried by individuals. Since they are portable devices, pagers carry a battery power source requiring replacement or recharge. In order to avoid frequent charging it is desirable that pager radio receivers be power efficient.

In U.S. Pat. No. 4,713,808, issued Dec. 15, 1987 to Gaskill, et al., pager power consumption is greatly reduced by a transmission protocol wherein radio receivers of individual pagers are only active during predetermined time slots. The broadcast stations which transmit messages are programmed to broadcast message data for a each pager during the time slots associated with that pager.

Transmission protocols, such as the above described Gaskill system, necessarily use a monitor interval longer than the associated time slot to compensate for unpredicted timing errors or inaccuracies. A longer monitor interval increases the probability that the radio receiver will be turned on to capture radio transmitted message data during the associated time slot. Since the monitor interval is longer than the time slot, the radio receiver is on for a time before the associated time slot. Such additional radio receiver on time contributes to inefficient power consumption. It is, therefore, desirable that the monitor interval be long enough to reliably receive message data, yet short enough to improve power conservation.

As the operating environment for each pager changes, its timing circuitry is affected and its timing or synchronization capability is thereby degraded and a monitor interval longer than the associated time slot is necessary. More particularly, to maintain high message reliability, it has been necessary to initiate the monitor interval in advance of the target time slot to accommodate a broad range of potential variations in environmental conditions through the lifetime of the pager. At one extreme of this range, prevailing environmental conditions cause the monitor interval to begin just before the target time slot. At the opposite extreme, prevailing conditions cause initiation of the monitor interval long before the target time slot. Such conservative measures taken to insure message reliability, however, contribute to excess power consumption.

OBJECTS AND ADVANTAGES OF THE INVENTION

It is an object of the present invention to improve power conservation in a radio pager.

It is a further object of the present invention to provide on-off radio receiver control responsive to changing operating environments.

It is yet a further object of the present invention to provide on-off radio receiver control while reliably receiving message data whereby the process of improving radio receiver power conservation does not degrade message reception.

SUMMARY OF THE INVENTION

The foregoing objects and advantages are achieved by having adaptive on-off control responsive to detected timing errors so that radio receiver on time is reduced and power conservation is improved.

The present invention provides a system that includes a periodically active radio pager which receives signals from a remote transmitter. The radio pager includes an internal timing reference which generates internal timing signals which control the interval during which the radio receiver is active and the interval during which the radio receiver is inactive. The radio pager also develops an external timing signal each time it is active and it receives a signal from the remote transmitter. Thus the system has two measures of the time interval between active periods, one is an internal signal derived from the internal timing reference (which can vary due to environmental and other factors) and the second is an external timming signal derived from the transmitted signal (which is highly accurate since the radio station can have a very accurate timing reference).

The radio receiver is turned on and off by the internal signal; however in order to conserve power the relationship between the internal timing reference and internal timing signals is modified if the sum of time in sequentially occurring active and inactive periods does not equal the time interval between sequential external timing signals.

Using this technique the relationship between the internal timing reference and the radio turn on time is constantly adapted to changing conditions and the turn on and turn off times can be more accurately controlled thereby conserving battery power.

BRIEF DESCRIPTION OF THE DRAWINGS

A complete understanding of the present invention may be obtained by reference to the accompanying drawings, when taken in conjunction with the detailed description thereof and in which.

DESCRIPTION OF THE PREFERRED EMBODIMENT

For expository convenience, the present invention will be illustrated with reference to a paging system (the "Gaskill system") described in U.S. Pat. No. 4,713,808 and in U.S. Pat. No. 4,897,835. However, it will be understood that the invention is not so limited. The disclosures of U.S. Pat. No. 4,713,808 and U.S. Pat. No. 4,897,835 are incorporated herein by reference.

Figure 1:
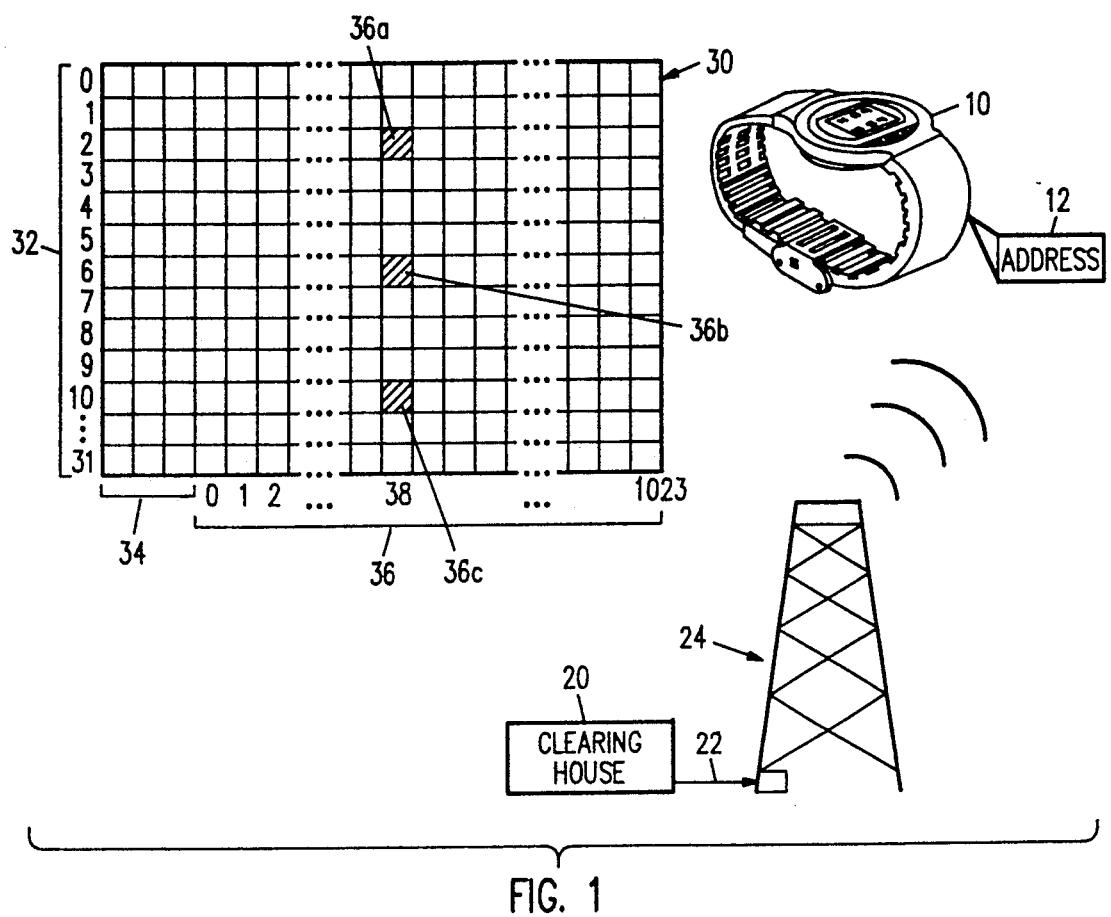
FIG. 1 illustrates a paging system using a synchronized transmission protocol wherein pagers activate during monitor intervals to receive message packets transmitted by a broadcast facility during corresponding message time slots.

The Gaskill system includes a number of wrist-watch pagers 10, of which one appears in FIG. 1, each having an associated pager address value 12 for identifying each pager 10 and determining when each pager 10 activates its radio receiver to receive message data. A central clearinghouse 20 processes and broadcasts message data to pager 10. Clearinghouse 20 communicates by way of communication link 22 to antenna tower 24 for broadcasting an FM radio signal to pager 10. Clearinghouse 20 is a fully automated, centralized facility which accepts messages, validates customer identification, determines message destinations, and routes messages to the appropriate broadcast station facility, e.g., tower 24, for transmission.

In accordance with the protocol of the Gaskill system, clearinghouse 20 and pager 10 both reference a time frame 30 divided into sub-frames 32, appearing as rows numbered 0 to 31 in FIG. 1. Each sub-frame 32 is further divided into three control time slots 34 and message time slots 36. The message time slots 36 are numbered 0 to 1023 in FIG. 1. Time frame 30 is of predetermined length, such as 7 and one-half minutes, and repeats cyclically. Thus, each sub-frame is approximately 14 seconds long and each of time slots 34 and 36 is approximately fourteen milliseconds long.

Address values 12 determine which message time slots 36 in time frame 30 are associated with a given pager 10. For example, pager 10 of FIG. 1 is programmed by address value 12 to activate eight times during each cycle of time frame 30, beginning in message time slot number 38 of sub-frame numbered 2 and repeating every fourth sub-frame, i.e., in subsequent sub-frames numbered 6, 10, 14, 18, 22, 26 and 30. Only the first three message time slots, 36a-36c, associated with pager 10 are shown in FIG. 1. However, it will be understood that reference to time slots 36a-36h will correspond to eight time slots 36 of time frame 30 associated with pager 10.

Figure 2:
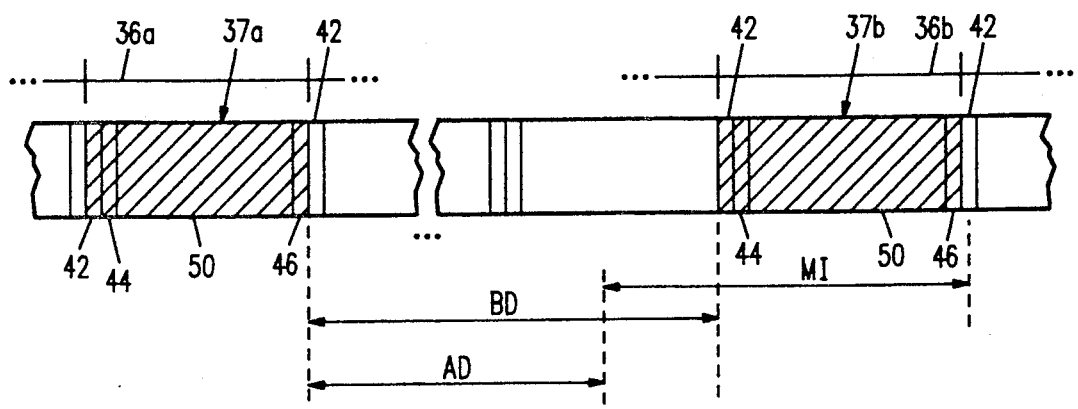
FIG. 2 illustrates fields of the message packets transmitted during the time slots shown in FIG. 1.

FIG. 2 illustrates data fields of message packets 37 transmitted during corresponding time slots 36. Each message packet 37 (note, packets 37A and 37B are examples of what we will call packet 37) carries 260 bits of information. The first twenty bits form a flag 42 indicating the beginning of a message packet 37. Another sixteen bits of each packet 37 provide an address field 44 uniquely identifying the corresponding time slot 36 in terms of sub-frame and slot number. The remaining field 50 of each packet 37 totals 224 bits and carries such information as message data, message numbers, continuation numbers, and frame check sequence numbers. Any given packet 37 is delimited by flags 42, one flag 42 at the beginning of the given packet 37 and one flag 42 at the beginning of a next packet 37.

Thus, the illustrated paging system uses a synchronized transmission protocol wherein pager 10 activates its radio receiver circuitry prior to an associated message time slot 36 in order to capture the corresponding message packet 37. For example, after receiving the message packet 37a transmitted during time slot 36a, pager 10 calculates a base delay BD corresponding to the offset between time slots 36a and 36b. Using the base delay BD, pager 10 calculates an activation delay AD corresponding to the offset between the end of time slot 36a and the beginning of a monitor interval MI. Pager 10 then deactivates its radio receiver for the calculated activation delay AD, and reactivates its radio receiver at the end of the activation delay AD to begin the monitor interval MI. The monitor interval MI begins prior to the target time slot 36b in order to insure that the radio circuitry is fully operational in time to receive the target message packet 37b transmitted during the target time slot 36b. As explained in greater detail hereafter, pager 10 detects the end of the target message packet 37b in order to terminate the monitor interval MI.

Pager 10 relies on its timing circuitry to begin the monitor interval MI just prior to a target time slot 36 to reliably receive the desired message data. Under ideal circumstances, pager 10 would activate its radio receiver at the beginning of an associated time slot 36, capture the message packet 37 broadcast during the time slot 36, deactivate its radio receiver at the end of the time slot 36, and later reactivate its radio receiver at the beginning of the next associated time slot 36.

Pager 10 is, however, subject to changing environmental conditions, including potentially drastic changes in temperature. Also, as the timing circuitry of pager 10 ages, its timing capability changes. Because of changes due to aging and the potential for environmental changes, it is necessary that pager 10 initiate the monitor interval MI in advance of the target time slot 36 such that timing errors will not result in lost target message data. The extent to which the monitor interval MI precedes the associated time slot could be a function of a broad range of timing errors, that range of timing errors possible over the operating life of pager 10. Because timing errors cannot be predicted, the activation delay AD could be calculated to initiate the monitor interval MI well in advance of the associated time slot 36 to accommodate such a broad range of potential timing errors. However, activation of the radio receiver in such a manner represents inefficient use of power because the radio receiver is activated for time during which the desired target message data is not available.

Figure 3:
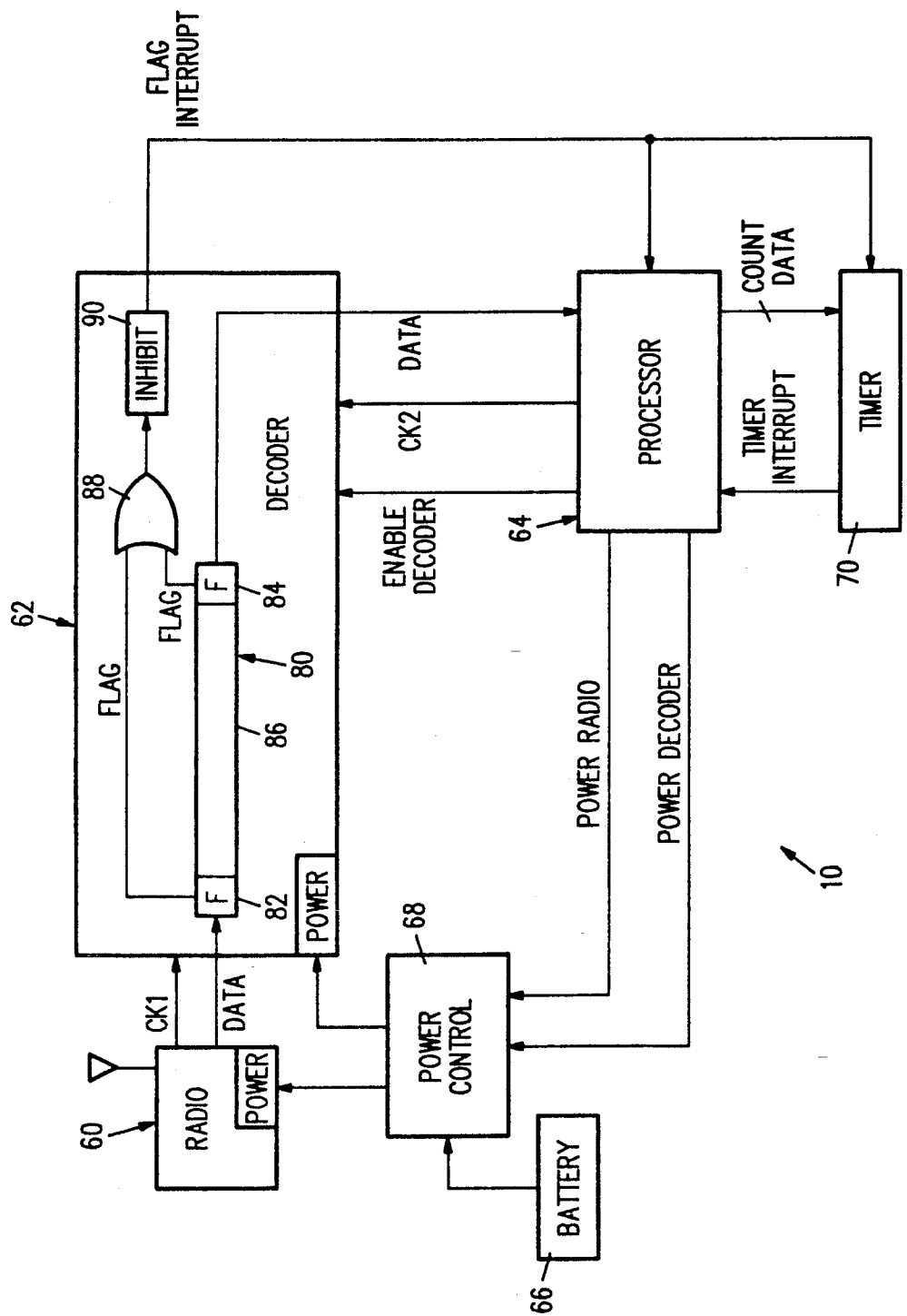
FIG. 3 is a block diagram of a pager of the paging system of FIG. 1.

In accordance with a preferred embodiment of the present invention, the extent to which the monitor interval MI precedes a target time slot 36 is a function of recent timing errors. Initiating the monitor interval MI long in advance of the corresponding target time slot 36 in order to accommodate a broad range of timing errors is avoided. Pager 10 notes recent timing errors and adapts activation delay AD in order to reduce radio on time prior to the target time slot 36 and thereby conserve power. FIG. 3 is a block diagram of the pager 10. Pager 10 includes a radio 60 for receiving and filtering radio transmitted message data originating from clearinghouse 20 (FIG. 1), a decoder block 62 coupled to radio 60 to capture message packets 37, and a processor 64 for controlling operation of pager 10. Processor 64 selectively applies power from a battery 66 to radio 60 and decoder 62 by way of power control 68. Processor 64 provides a POWER RADIO signal, in response power control 68 couples battery 66 to radio 60. Processor 64 also provides a POWER DECODER signal, and control 68 responds by coupling battery 66 to decoder 62. Decoder 62 may be implemented as a CMOS device whereby its power consumption is minimal while not in use. Processor 64 enables us of decoder 62 by applying an ENABLE DECODER signal to decoder 62. Radio 60 is not a CMOS device. It is, therefore, important that radio 60 be coupled to battery 66 only when necessary to receive radio transmitted message data, and decoupled when not needed to receive message data. By suitably activating and deactivating radio 60, overall power consumption may be reduced.

To time the activation of radio 60, pager 10 includes a timer 70 coupled to processor 64. Processor 64 loads a COUNT DATA value into timer 70 corresponding to the activation delay AD. Timer 70 provides a TIMER INTERRUPT signal to processor 64 indicating the end of the activation delay AD and initiating the monitor interval MI. Thus, pager 10 first determines a suitable delay period for deactivation of radio 60, loads a corresponding COUNT DATA valve into timer 70, and waits until the occurrence of the TIMER INTERRUPT signal to activate radio 60 for receiving message data.

To receive message data, processor 64 activates radio 60 and decoder 62 by applying POWER RADIO and POWER DECODER signals, respectively, to control 68 and enables use of decoder 62 by applying the ENABLE DECODER signal to decoder 62. Radio 60 provides a CK1 clock signal and a serial DATA signal to decoder 62. Decoder 62, upon detecting the ENABLE DECODER signal, applies the CK1 clock signal to a shift register 80 to load the serial DATA signal into the shift register 80. Shift register 80 includes flag detect logic 82 as an input stage and flag detect logic 84 as an output stage. Flag detect logic 82 and 84 each hold twenty bits of the DATA signal, enough for each to hold a flag 42. The central portion 86 of shift register 80 holds 240 bits of the DATA signal, enough to hold all but flag 42 of a message packet 37. Logic 82 and 84 each respond to the presence of a flag 42 therein by providing separate FLAG signals as input to OR logic 88.

As a message packet 37 shifts into register 80, its flag 42 eventually reaches logic 84 at the same time that the flag 42 of the next message packet reaches logic 82. At this time, central portion 86 of register 80 holds the remainder of the message packet 37, i.e., fields 44, 46 and 50. Both logic 82 and 84 signal capture of a complete message packet 37 in register 80 by generating the respective FLAG signals. In the event of data error relative to one of the delimiting flags 42 held in logic 82 or 84, and the corresponding logic 82 or 84 fails to generate a FLAG signal, OR logic 88 receives only one FLAG signal. However, detecting the presence of a flag 42 in either logic 82 or logic 84 is sufficient to imply capture of a complete message packet 37 in register 80. Accordingly, use of logic 82 and logic 84 in conjunction with OR logic 88 is a type of error recovery in the event of transmission errors relative to one of the flags 42.

When either of logic 82 or logic 84 generates a FLAG signal, OR logic 88 responds with an output signal directed to INHIBIT logic 90. Because logic 82 receives a flag 42 at the beginning of a monitor interval MI, and therefore, produces a FLAG signal prior to capture of a complete message packet 37 in register 80, it is necessary to inhibit the output of OR logic 88 at least until the first flag 42 passes through logic 82. Accordingly, INHIBIT logic 90 monitors clock signal CK1 following presentation of the ENABLE DECODER signal and does not respond to the output of OR logic 88 until, for example, 260 bits are shifted into register 80. Thereafter, INHIBIT logic 90 responds to the output of OR logic 90 by applying a FLAG INTERRUPT signal to processor 64. Simultaneously, INHIBIT logic 90 also inhibits further application of clock signal CK1 to register 80 to prevent additional input of the DATA signal into register 80. A message packet 37 is thereby captured in register 80.

Processor 64 responds to the FLAG INTERRUPT signal by generating a CK2 clock signal for application to decoder 62. Decoder 62 in turn applies the CK2 clock signal to register 80 to shift out the contents of register 80 to processor 64. Processor 64 thereby receives the captured message packet 37 from radio 60 and decoder 62.

The FLAG INTERRUPT signal is also applied to the timer 70 to reset the timer 70 count to zero. Timer 70, counting up from zero, eventually reaches a value corresponding to the COUNT DATA value, and initiates the next monitor interval MI by generating the TIMER INTERRUPT signal. As will be explained hereafter, processor 64 recalculates the COUNT DATA value based on detected timing errors in order to adapt initiation of the next monitor interval MI. For associated time slots 36 having a fixed offset, e.g., time slots 36a–36h, the COUNT DATA value held in timer 70 remains substantially static except for modification by processor 64 to adapt to current timing errors.

Figure 4:
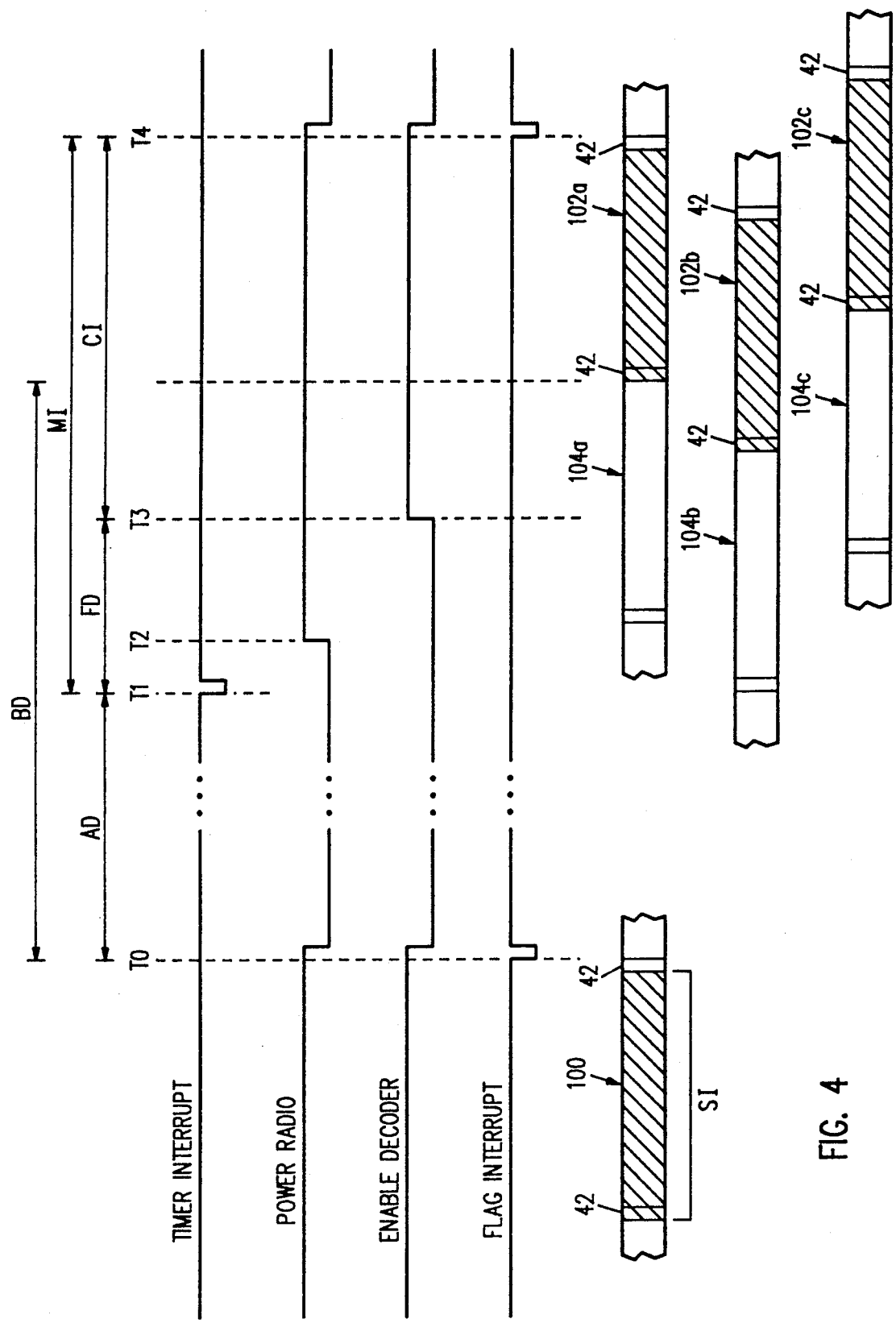
FIG. 4 is a timing diagram for activation and deactivation of portions of the pager shown in FIG. 2 relative to message time slots.

FIG. 4 illustrates timing relationships between the signals TIMER INTERRUPT, POWER RADIO, ENABLE DECODER and FLAG INTERRUPT relative to the time frame 30 (FIG. 1). With reference to FIG. 3 in conjunction with FIG. 4, pager 10 raises the POWER RADIO and ENABLE DECODER signals to receive a synchronization message packet 100. In the following discussion, it will be assumed that packet 100 may be a message packet 37 associated with pager 10, i.e., transmitted during one of time slots 36a–36h. However, for the purpose of synchronizing with the time frame 30, packet 100 could be any packet 37.

Decoder 62 captures the packet 100 in shift register 80 and asserts the FLAG INTERRUPT signal at a time T0. In this case, the FLAG INTERRUPT signal is asserted by a falling edge. The FLAG INTERRUPT signal is held low for a brief interval and, in response to its rising edge, processor 64 drops or de-asserts the POWER RADIO and ENABLE DECODER signals. The synchronization packet 100 contains identifying information, i.e., sub-frame and slot numbers, for permitting pager 10 to determine when a target packet 102, one transmitted during time slots 36a–36h, will occur. Processor 64 then loads a suitable COUNT DATA value into timer 70.

Upon later reaching the COUNT DATA value, timer 70 asserts the TIMER INTERRUPT signal at a time T1. In response, processor 64 raises the POWER RADIO signal to activate radio 60 at a time T2. The time period T1-T2 corresponds to processor 64 response time for detecting and responding the TIMER INTERRUPT signal, and is a fixed time period. Processor 64 asserts the POWER RADIO signal at time T2 causing radio 60 to power-up and tune-in to the proper radio frequency for receiving message data. The time period T2-T3 is a fixed period long enough to permit radio 60 to power-up and tune-in to the proper radio frequency. Processor 64 assumes that radio 60 is suitably activated and receiving message data at a time T3. At time T3, processor 64 asserts the ENABLE DE- CODER signal to capture in register 80 message data available from radio 60. When decoder 62 has captured message packet 102 in register 80, decoder 62 asserts the FLAG INTERRUPT signal causing processor 64 to de-assert the POWER RADIO and ENABLE DECODER signals, and causing reset of timer 70.

The time period T0-T1 is the activation delay AD and corresponds to the COUNT DATA value loaded into timer 70. The period T1-T4, between assertion of the FLAG INTERRUPT signal resetting timer 70 to a zero count and assertion of the TIMER INTERRUPT signal indicating that timer 70 has reached the specified count is the monitor interval MI. The activation delay AD is a relatively long period compared to the monitor interval MI, and is subject to unpredictable error resulting from environmental conditions or aging of the timing circuitry of pager 10. In contrast, the periods T1-T2 and T2-T3 are relatively much shorter and may be taken as a known or fixed delay FD. The remaining portion of the monitor interval MI is the time period T3-T4, a capture interval CI which varies in duration depending on when the time T3 occurs relative the captured message packet 102.

Consider three positions for the target packet 102 relative to the time T3, as illustrated by packets 102a-102c in FIG. 4. The preferred location is shown as the target packet 102a where the time T3 coincides with the approximate midpoint of the preceding packet 104a. In calculating the activation delay AD, i.e., a COUNT DATA value for timer 70, processor 64 determines the base delay BD between packet 100 and target packet 102, subtracts the fixed delay FD, and further subtracts one-half the duration SI of a time slot 36 to place the time T3 at the mid-point of the preceding packet 104a. Thus, $$AD = BD - FD - (0.5 * SI)$$

However, due to unavoidable and unpredictable timing errors in the period T0-T1, the time T3 does not always coincide with the mid-point of the preceding packet 104a.

Packets 102b and 102c illustrate the position of time T3 relative to target packet 102 when a timing error occurs in the time period T0-T1. When a timing error in the circuitry of pager 10 causes extension of time period T0-T1 relative to the time frame 30, the time T3 occurs late relative to the preferred position, as shown by the position of target packet 102b and the preceding packet 104b. When the time period T0-T1 is shortened, the time T3 is early relative to the preferred position, as shown by the target packet 102c and the preceding packet 104c.

The illustrated positions of packets 102b and 102c illustrate boundary conditions for successfully capturing the target packet 102. As previously described, decoder 62 captures the next complete message packet 37 following activation of the ENABLE DECODER signal. If the time T3 occurs too early relative to the packet 102, for example, before the preceding packet 104, the message data of packet 104 will be captured, not the data of the target packet 102. Similarly, if the time T3 occurs too late relative to the packet 102, for example, during transmission of the packet 102, the message data of packet 102 will not be captured. In relatively static environmental conditions, the position of time T3 relative to time frame 30 will be substantially consistent.

It may be noted particularly in the case of packet 102c, that, given relatively static environmental conditions, the monitor interval MI could be shortened to conserve battery power. In the case of packet 102c, the capture interval CI begins at the beginning of the preceding packet 104c, the radio 60 of pager 10 is on for almost a full slot interval SI plus the fixed delay FD. It is, therefore, desirable that pager 10 adjust or adapt the position of time T3 relative to the next target packet 102 in order to conserve battery power. Such adaptation is accomplished by variation in the activation delay AD, i.e., the COUNT DATA value loaded into timer 70.

In the following discussion, adaptation of the activation delay AD will be based on the preferred position of time T3 relative to the target packet 102, at the approximate midpoint of the preceding packet 104a. However, it will be understood that such adaptation may be accomplished for the purpose of pushing the time T3 as close as possible to the target packet 102b. In the process of adaptation, however, the savings associated with conservation of battery power by pushing the time T3 close to the target packet 102 must be weighed against the cost of reduced message reliability. If pager 10 operates with the time T3 occurring just before the target packet 102, slight timing errors in the activation delay AD positioning the time T3 within the target packet 102 result in lost message data.

Figure 5:
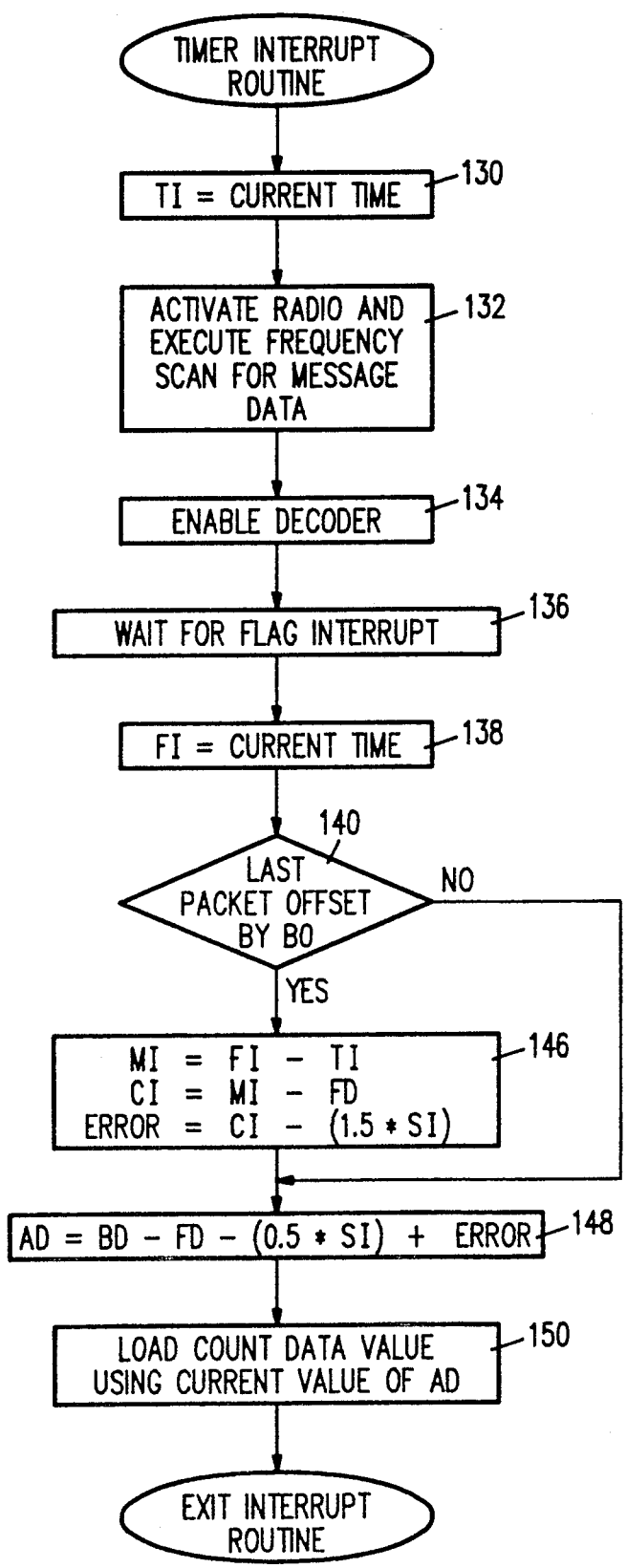
FIG. 5 is a flow chart of an interrupt routine for the pager of FIG. 1.

Timing errors associated with the activation delay AD, i.e., the time period T0-T1, may be determined by measurement of the monitor interval MI, i.e., time period T1-T4. If the activation delay AD was accurate relative to the time frame 30, the monitor interval MI will equal an expected value, and variation from that expected value represents a timing error in the activation delay AD. More particularly, the capture interval CI varies in accord with timing errors in the activation delay AD. In the case of packet 102b, the capture interval CI is shortened relative to that expected. In the case of packet 102c, the capture interval CI is lengthened. By determining the length of the capture interval CI, it is possible to determine timing errors in the activation delay AD. Once timing errors are noted in the activation delay AD, it is possible to adjust the activation delay AD to account for such timing errors and thereby place the time T3 at the preferred position, at the midpoint of the preceding message packet 104. FIG. 5 illustrates a processor 64 timer interrupt routine which responds to the TIMER INTERRUPT signal. In addition to performing the tasks of activating radio 60 and enabling decoder 62, the interrupt routine detects timing errors in the activation delay AD and adapts calculation of the next activation delay AD to account for such errors.

In FIG. 5, the TIMER INTERRUPT routine begins in block 130 where processor 64 assigns to the variable TI the value of the current time. It will be understood that pager 10 includes timing circuitry holding, for example, the current time of day which may be accessed to obtain a time value. Block 130 executes at the beginning of time period T1-T2 in FIG. 4. In block 132, at time T2, pager 10 activates the radio receiver 60 and executes a frequency scan for message data. Continuing in block 134, at the time T3, processor 64 asserts the ENABLE DECODER signal to begin a capture interval CI. In response to the ENABLE DECODER signal, decoder 62 begins shifting the DATA signal, as provided by radio 60, into register 80. In the meantime, in block 136, processor 64 waits for the FLAG INTER- RUPT signal from the decoder 62. Eventually, decoder 62 captures a message packet 37 in register 80 and asserts the FLAG INTERRUPT signal at the time T4. Processor 64 responds, in block 138, by assigning to a variable FI the current time.

In decision block 140, processor 64 determines whether the last packet received was offset by the base delay BD, i.e., whether the last packet was one of packets 36a-36h. If the last packet was offset by the base delay BD, processing continues to block 16, otherwise processor 64 skips block 146. In block 146 timing errors in the activation delay are calculated. The difference between the value of variable FI and the value of variable TI corresponds to the offset between the time T4 and the time T1, the monitor interval MI, and is assigned to the variable MI. The fixed delay FD is subtracted from the variable MI to derive the length of the capture interval CI. A timing error is then calculated. The variable ERROR receives the value of the variable CI, the measured or actual capture interval, less the expected value of the capture interval, in this case ($1.5 \times SI$) where SI equals the length of a time slot 36. The value of the variable ERROR, which may be positive or negative, represents a timing error for the previous activation delay AD. In block 148, processor 64 recalculates the activation delay AD by incorporating the current value of the variable ERROR to either increase or decrease activation delay AD. If block 146 was skipped, in the event that the last captured packet was not offset by the base delay BD, an old value for the variable ERROR is used. In this manner, the value of ERROR represents an error associated with the base delay BD. In block 150, processor 64 places a corresponding new COUNT DATA value in timer 70 and exits the TIMER INTERRUPT routine at exit node 152.

Processing then continues as previously described. Timer 70 eventually produces a TIMER INTERRUPT signal, processor 64 responds by initiating a monitor interval MI, and the monitor interval MI terminates upon capture of a message packet. The process continues with pager 10 adaptively adjusting the activation delay AD in order to place the time T3 at the midpoint of the preceding message packet 104. As environmental conditions change or the timing circuitry ages, pager 10 responds in the desired adaptive manner.

In addition to the associated time slots 36a-36h of time frame 30, the pager 10 may be programmed to respond during an arbitrary sequence of times slots 30. Clearinghouse 20 could provide a prearranged list of time slots 36, in terms of sub-frame and slot number, to identify a list of target message packets 37. Alternately, a linked list of packets 37 could be provided with each packet 37 identifying the next target message packet 37 in the list. In either case, pager 10 would be required to derive an activation delay AD for each intervening period between packets in the list, and each activation delay AD would vary. Because the value held in the variable ERROR represents an error factor based on the offset between the time slots 36a-36h, it is not directly applicable to adjust for timing errors corresponding to an arbitrary activation delay AD. It may, however, be used to derive an error adjustment for an arbitrary activation delay AD. A ratio of the base delay BD, the separation between time slots 36a-36h, and the current value of ERROR represents an error adjustment which may be applied to an arbitrary activation delay AD. Thus, once a new activation delay AD is calculated, it is adjusted as follows:

$$AD = AD * [1 + (ERROR/BD)]$$

The new value of the activation delay AD will thereby reflect recent timing errors and increase the probability that the next monitor interval MI will begin in the desired position relative to the next target message slot 36 in the list.

While the present invention has been shown in the context of the Gaskill paging system, it should be understood that the scope of the present invention should not be so limited. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

We claim:

1. A radio paging receiver for a paging system which transmits signals from a transmitter to said paging receiver according to a time slot protocol, said radio paging receiver including,
   periodically active radio circuit means which is periodically active for short periods of time to receive signals from said transmitter,
   an internal timing reference in said radio circuit for generating an internal timing reference signal,
   means for generating first timing signals from said internal timing reference signals,
   means responsive to said first timing signals for controlling the interval during which said radio circuit means is active and the interval during which said radio circuit means is inactive,
   means for deriving a second timing signal each time said radio circuit means is active, said second timing signal being derived from said signal transmitted by said transmitter,
   means for modifying the relationship between said internal timing reference and said first timing signals if the sum of sequentially accruing active and inactive periods of said radio circuit means do not equal the time interval between sequential ones of said second timing signals,
   whereby the activation of said radio circuit means in said paging receiver is synchronized with the transmission from said transmitter.

2. A radio receiver for receiving signals from a radio transmitter, said transmitter transmitting signals in accordance with a time slot protocol, said receiver comprising
   radio receiver means which are periodically active for short periods to receive signals from said transmitter,
   an internal timing reference in said radio receiver means which generates first timing signals which control the active and inactive periods of said radio receiver,
   means for deriving a first timing measurement from the signals received from said transmitter,
   means for deriving a second timing measurement from said internal timing reference,
   means for changing the relationship between said internal timing reference and said first timing signals if said first and second timing measurements are not equal, means for activating said radio receiver in response to said first timing signals, whereby the activation of said radio receiver is synchronized with said time slots in said time slot protocol of said transmitter.

3. In a communication system where a transmitter and a receiver are synchronized and wherein information is transmitted from the transmitter to the receiver according to a time slot protocol, a method for compensating for timing inaccuracy in a timing circuit relative to events of a time frame taken as being accurate, said time frame being related to the time slots in said time slot protocol, the method comprising the steps:

calculating a first expected offset between a first event of said time frame and a second event of said time frame;

using said timing circuit to initiate a first communication activity between said transmitter and said receiver based on the expected offset;

calculating a timing error based on an offset between said second event and initiation of said communication activity;

calculating a second expected offset between said second event of said time frame and a third event of said time frame including compensation based on said timing error; and using said timing circuit to initiate a second communication activity from said transmitter to said receiver based on said second expected offset, whereby the amount of timing error associated with said second communication is reduced.

4. A method according to claim 3 wherein said communication system comprises a radio communication system wherein the transmitter transmits message packets to said receiver during predetermined time slots associated with said receiver and said receiver activates during monitor intervals to receive said message packets.

5. A method according to claim 3 in a synchronized radio paging system wherein the timing circuitry is timing circuitry in a radio pager, a broadcast facility broadcasts message packets to radio pager during predetermined time slots associated with the pager, said radio pager deactivates a portion of its circuitry to reduce power consumption between said first event and the second events.

* * * * *